A. ZAINO.
MEASURING TOOL.
APPLICATION FILED MAY 25, 1909.
999,425.
Patented Aug. 1, 1911.
3 SHEETS—SHEET 1.
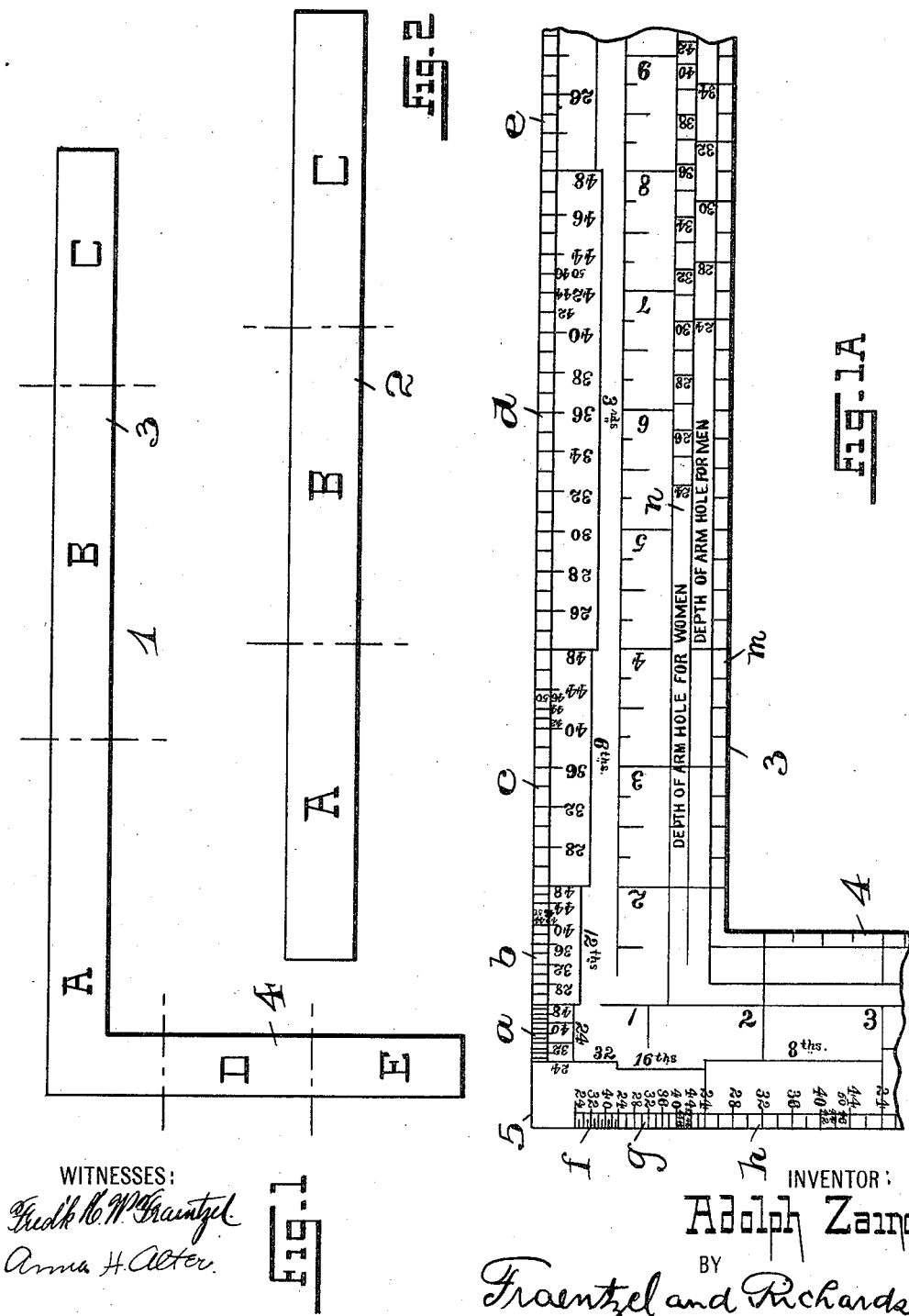
WITNESSES:
Fred'k H. W. Fraentzel
Anna H. Alter.
INVENTOR:
Adolph Zaino,
BY
Fraentzel and Richards,
ATTORNEYS.

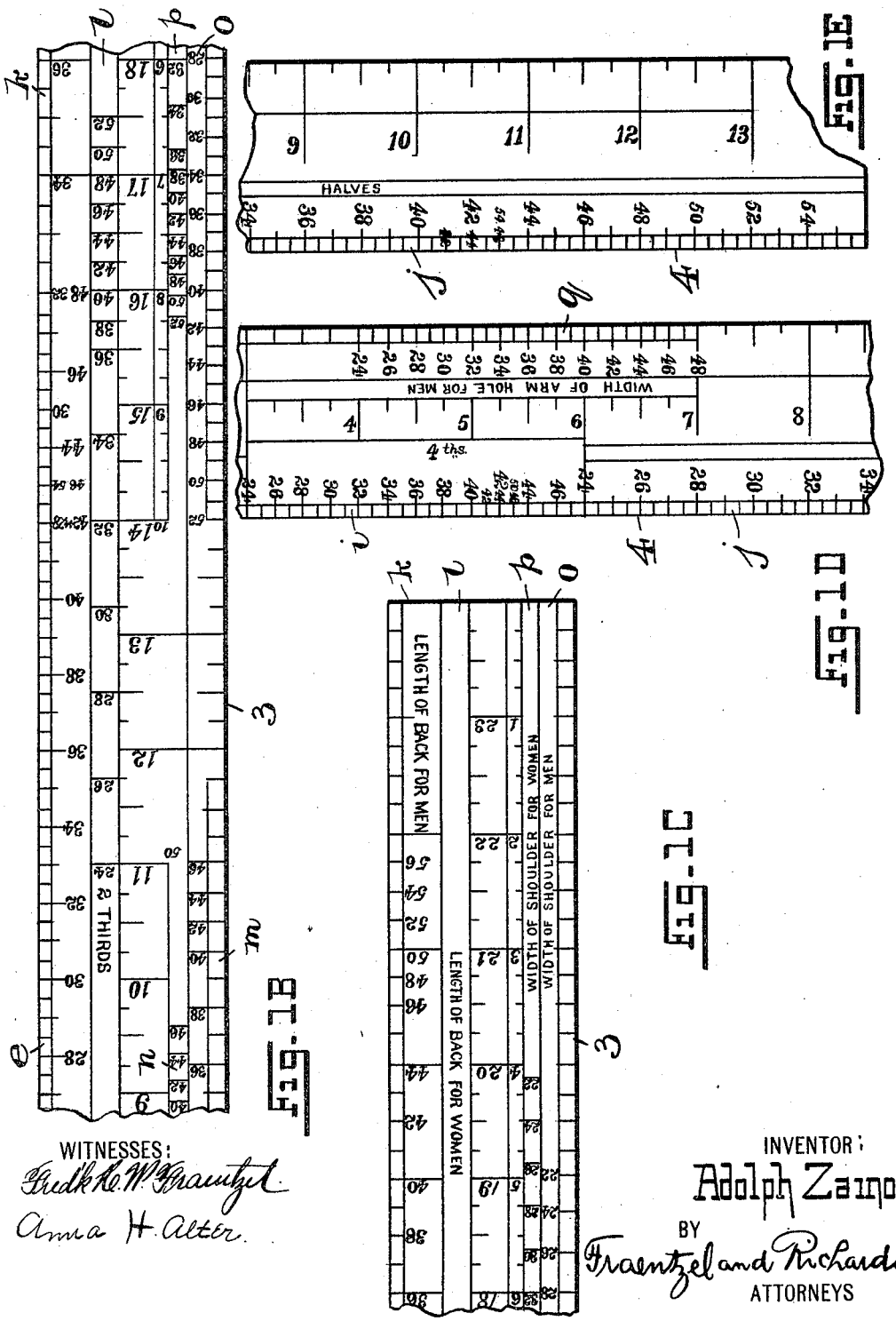

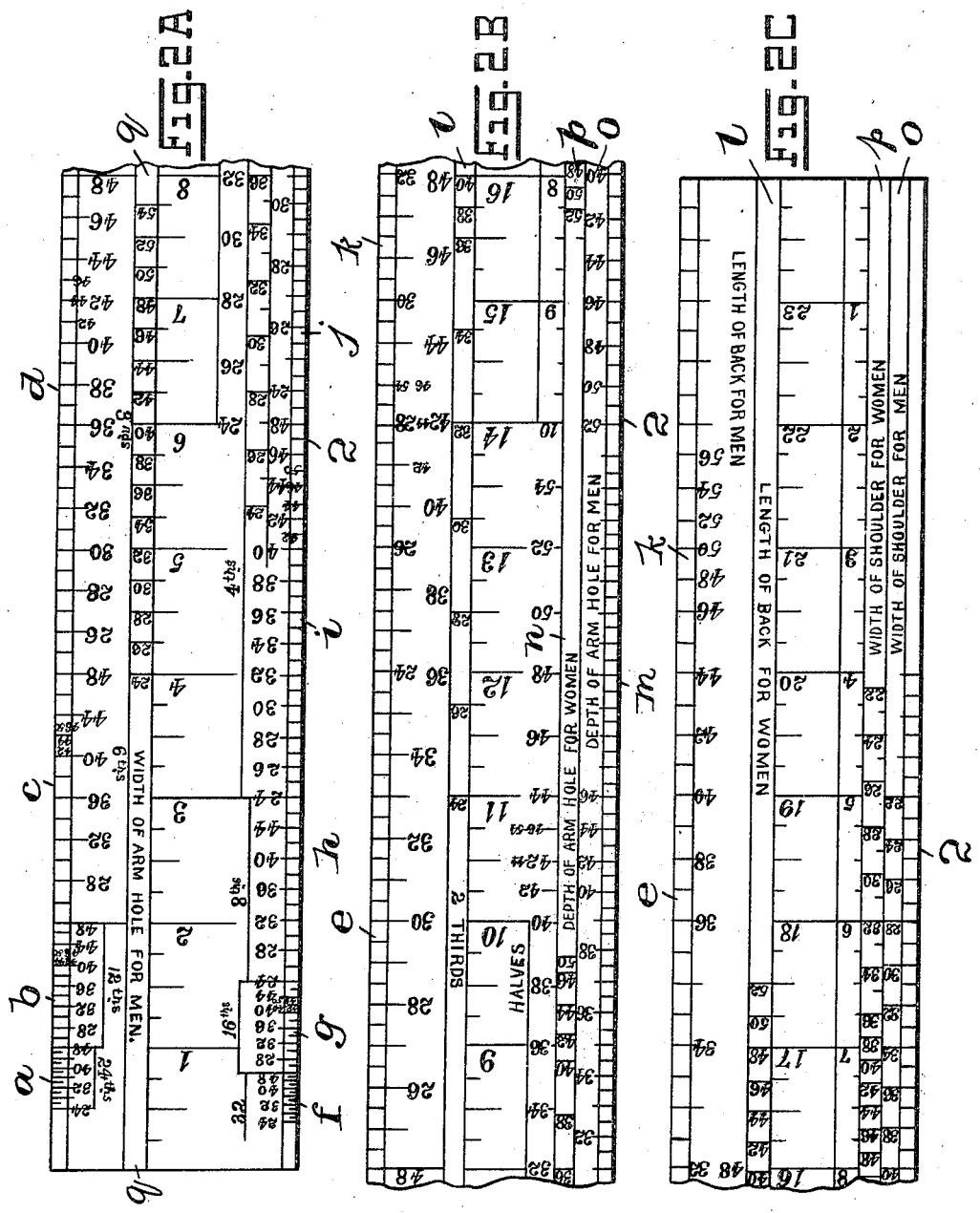

UNITED STATES PATENT OFFICE.

ADOLPH ZAINO, OF NEW YORK, N. Y.

MEASURING-TOOL.

999,425.　　　　Specification of Letters Patent.　　Patented Aug. 1, 1911.

Application filed May 25, 1909. Serial No. 498,288.

*To all whom it may concern:*

Be it known that I, ADOLPH ZAINO, a citizen of the United States, residing at New York, in the county of New York and State of New York, have invented certain new and useful Improvements in Measuring Tools or Implements; and I do hereby declare the following to be a full, clear, and exact description of the invention, such as will enable others skilled in the art to which it appertains to make and use the same, reference being had to the accompanying drawings, and to characters of reference marked thereon, which form a part of this specification.

This invention has reference, generally, to improvements in measuring appliances; and, the invention relates, more particularly, to a novel form of measuring tool or implement, which is preferably made in the form of a square, but which can also be made in the shape of a straight-edge, and which is to be used for laying out patterns or dress-charts for both men and women.

My present invention has for its principal object to provide a novel form of measuring implement provided with scales of the character hereinafter set forth, which is especially adapted for use by tailors, dressmakers, and designers in making suitable patterns and dress-charts to which garments for both men and women are to be cut, in various sizes, say from 24 inches to 48 inches, and in laying out the designs of the various parts of the garments upon paper or for arranging the lines to which a garment is to be cut directly upon the cloth.

The invention has for its further object to provide a measuring and laying-out device, preferably in the form of a square, which bears upon its face or faces an ordinary scale, usually representing inches and feet, but in addition thereto is made with other notations in the form of scale-representations which indicate various measurements or sizes of patterns to which a garment is to be cut by the tailor; and, another object of this invention is to provide a measuring device or implement which bears upon its face or faces, in addition to the various scale-representations, certain words and notations which instruct or designate to the designer the use of the various parts of the device or implement in laying out a pattern.

Other objects of this invention not at this time more particularly enumerated will be clearly understood from the following detailed description of my present invention.

With the various objects of my present invention in view, the said invention consists, primarily, in the novel measuring and laying-out appliance or implement of the general character hereinafter set forth; and, the invention consists, furthermore, in the novel arrangements and combinations, as well as in the various details of the tailor's measuring device or implement more fully described in the following specification and then finally embodied in the clauses of the claim which are appended to and which form an essential part of the said specification.

The invention is clearly illustrated in the accompanying drawings, in which:—

Figures 1 and 2 are diagrammatic representations of a square and straight-edge, respectively, with which my novel forms of scale-representations may be employed. Figs. 1$^A$, 1$^B$, 1$^C$, 1$^D$ and 1$^E$, are full-size face-views of the portions marked A, B, C, D and E in said Fig. 1, and provided with the scale-representations embodying the principles of my present invention. Figs. 2$^A$, 2$^B$ and 2$^C$ are similar views of the portions marked A, B and C in said Fig. 2, illustrating the application of my present invention to a straight-edge.

Similar characters of reference are employed in all of the above described views, to indicate corresponding parts.

As is well-known in the manufacture of boys' and men's suits all sizes of the parts of a suit are made according to conventional patterns figured from the actual chest-measurement of a person, and consequently in the trade the sizes of suits are known as a " twenty - four ", " twenty - six ", " twenty-eight", and so on to a "forty-eight" size, all based upon corresponding chest-measurements.

In designing or laying out a pattern for a suit, the tailor having once selected or decided upon the chest-measurement, can therefrom readily determine the various lines of the required pattern, and with the use of my novel form of measuring appliance the required pattern can be readily and quickly laid out without requiring any undue thinking and without any tedious figuring on the part of the tailor or designer of the pattern.

Referring now to the several figures of the drawings, the reference-character 1 in Fig. 1 indicates a suitably formed square, and in Fig. 2 the reference-character 2 indicates a suitable straight-edge, both of said devices being provided, as shown in the other figures of the drawings, with scale-representations and notations embodying the principles of my present invention.

In practice, the implement is preferably made in the form of a square, so as to be provided with two angularly arranged arms or members 3 and 4. The surfaces of these arms or members are provided with graduations and markings, indicating various proportionate measurements, to be used in the manner hereinafter explained, the graduations and the numerals which are employed in connection therewith and which indicate sizes, being arranged in columns parallel to the edges of said arms 3 and 4. For instance, the short arm 4 is provided with two contiguous parallel columns, and the long arm 3 is provided with four contiguous columns, and upon both arms 3 and 4 are arranged contiguous to said columns an inner or fifth column of graduations, representing standard measurements, such as the ordinary inch rule, to be employed in various ways with the other graduations and markings in laying out different patterns or dress-charts for both men and women.

As shown in the several detail figures of the drawings, the device, whether in the form of a square or a straight-edge, is formed with any usual main scale, having its scale-indications, either in inches or in the metric system, and in addition thereto the device is provided with other scale-representations or indications, $a, b, c, d, e, f, g, h, i$ and $j$. These various scale-notations or indications are laid out in various divisions representing proportions of inches or the like, which are to be used in laying or marking out certain parts of patterns for different sizes of suits, the said scale-indications having respectively arranged in close proximity thereto such indications, as "24ths," "12ths," "6ths," "3rds," "2-thirds," "16ths," "8ths," "4ths," and "halves," such terms indicating sizes and being well-known and familiar to tailors and such other persons employed in designing and laying out the patterns to which suits are to be cut.

In addition to the said scale-notations or indications $a, b, c, d, e, f, g, h, i$ and $j$, other scale-notations or indications $k, l, m, n, o, p$ and $q$, substantially as shown in the several figures of the drawings, and bearing, respectively, the wording, "Length of back for men," "Length of back for women," "Depth of arm-hole for men," "Depth of arm-hole for women," "Width of shoulder for men," "Width of shoulder for women," and "Width of arm-hole for men," may be used.

The various scale-indications are arranged upon the respective members 3 and 4 of the square represented in Fig. 1 of the drawings in the manner previously stated, and are to be read from the corner-portion 5 of the square and from left to right upon the member 3, and from the top to the lower end-portion of the member 4.

Referring now to the columns of measurements upon the short arm of the square, adjacent to or along the outer edge thereof, the following series of measurements are found, and their uses are as follows: Scale $f$—designed for use in laying off the length of back of coat, etc. Scale $g$—designed for use in laying off the shoulder and side of body of coat, etc. Scale $h$—designed for use in laying off the length of shoulder, back and front. Scale $i$—designed for use in laying off the length of sleeve. Scale $j$—designed for use in laying off the depth of sleeve. Along the opposite and inner edge of the long arm of the square, scales $m$ and $n$ are made in such a manner, so as to be used, respectively, for laying out in the pattern the depths of the arm holes for men and women.

Referring now to the columns of measurements upon the long arm of the square, adjacent to or along the outer edge thereof, the following series of measurements are found and their uses are as follows:—Scale $a$—designed for use in laying off the height of neck. Scale $b$—designed for use in laying off the length of front. Scale $c$—designed for use in laying off the back of neck. Scale $d$—designed for use in laying off the length of the back of shoulder. Scale $e$—designed for use in laying off the shoulder and sleeve-elbow. Scale-portions $k$ and $l$ are designed for use, respectively, in laying off the "length of back for men," and the "length of back for women." Along the opposite and inner edge of the long arm of the square;—scales $o$ and $p$ are made in such a manner, so as to be used for laying out in the pattern, respectively, the "width of shoulder for men," and the "width of shoulder for women."

In the straight-edge construction, the said various scale-indications are read from right to left.

The manner of preparing or laying out a design or pattern for a garment, by means of the various scale-notations or indications found upon the measuring appliance is not essential to the description of my present invention, as the manner of employing the scale-indications for the different sizes of pattern which are required in tailoring will be clearly evident to those skilled in the art, and need therefore not be further described at this time.

I claim:—

1. A tailor's appliance for laying out or designing patterns provided upon its face with a main scale, a series of other scale-notations $a, b, c, d, e, f, g, h, i$ and $j$, having numbers indicating size-measurements, said scale-notations having, respectively, suitable indications, as 24ths, 12ths, 6ths, 3rds, 2-thirds, 32nds, 16ths, 8ths, 4ths, and halves, located in close proximity thereto, and other scale-notations $k, l, m, n, o$ and $p$, having numbers indicating size-measurements, and said last-mentioned scale-notations having, respectively, suitable indications, as "Length of back for men", "Length of back for women," "Depth of arm-hole for men," "Depth of arm-hole for women", "Width of shoulder for men," "Width of shoulder for women", and "Width of arm hole for men."

2. A tailor's square for laying out or designing patterns comprising a pair of square-members, a main scale upon the face of each square-member, a series of other scale-notations $a, b, c, d$ and $e$ having numbers indicating size-measurements, said scale-notations being located upon one of said square-members, suitable indications, as 24ths, 12ths, 6ths, 3rds, and 2-thirds located in close proximity thereto, a series of other scale-notations $f, g, h, i$ and $j$ having numbers indicating size-measurements, said scale-notations being located upon the other square-member, and suitable indications, as 32nds, 16ths, 8ths, 4ths, and halves, located in close proximity thereto, substantially as and for the purposes set forth.

3. A tailor's square for laying out or designing patterns comprising a pair of square-members, a main scale upon the face of each square-member, a series of other scale-notations $a, b, c, d$ and $e$ having numbers indicating size-measurements, said scale-notations being located upon one of said square-members, suitable indications, as 24ths, 12ths, 6ths, 3rds, and 2-thirds located in close proximity thereto, a series of other scale-notations $f, g, h, i$ and $j$ having numbers indicating size-measurements, said scale-notations being located upon the other square-member, and suitable indications, as 32nds, 16ths, 8ths, 4ths, and halves, located in close proximity thereto, other scale-notations $k, l, m, n$ and $o$ located upon said first-mentioned square-member, said scale-notations having, respectively, suitable indications, as "Length of back for men," "Length of back for women", "Depth of arm-hole for men", "Depth of arm-hole for women," "Width of shoulder for men", and "Width of shoulder for women," and a scale-notation $q$ upon said second-mentioned square-member, said scale-notation having an indication, as "Width of arm-hole for men", substantially as and for the purposes set forth.

In testimony, that I claim the invention set forth above I have hereunto set my hand this 22nd day of May, 1909.

ADOLPH ZAINO.

Witnesses:
FRANK D. SOLE,
MOIE DE BLAKE.

---

Copies of this patent may be obtained for five cents each, by addressing the "Commissioner of Patents, Washington, D. C."